United States Patent
Hoshi et al.

(10) Patent No.: US 7,483,814 B2
(45) Date of Patent: Jan. 27, 2009

(54) CONSTRUCTION MACHINERY

(75) Inventors: Kouji Hoshi, Hirakata (JP); Mitsunori Matsuda, Hirakata (JP)

(73) Assignee: Komatsu Ltd., Tokyo (JP)

( * ) Notice: Subject to any disclaimer, the term of this patent is extended or adjusted under 35 U.S.C. 154(b) by 137 days.

(21) Appl. No.: 10/570,152

(22) PCT Filed: Sep. 1, 2004

(86) PCT No.: PCT/JP2004/012645

§ 371 (c)(1),
(2), (4) Date: Mar. 1, 2006

(87) PCT Pub. No.: WO2005/024209

PCT Pub. Date: Mar. 17, 2005

(65) Prior Publication Data

US 2006/0287841 A1    Dec. 21, 2006

(30) Foreign Application Priority Data

Sep. 2, 2003 (JP) ............ 2003-310367
Jul. 12, 2004 (JP) ............ 2004-204406

(51) Int. Cl.
*G06F 11/30* (2006.01)
(52) U.S. Cl. .................................. 702/182
(58) Field of Classification Search ........... 702/32, 702/41, 44, 57, 122, 145, 182, 184, 193; 701/22, 51, 53, 123
See application file for complete search history.

(56) References Cited

U.S. PATENT DOCUMENTS

| 4,647,902 A | 3/1987 | Teshima et al. |
| 5,481,875 A | 1/1996 | Takamura et al. |
| 6,851,207 B2* | 2/2005 | Yoshimatsu ............ 37/348 |
| 6,985,804 B2* | 1/2006 | Minami ................. 701/64 |
| 2002/0045986 A1* | 4/2002 | Tamaru ................. 701/211 |
| 2003/0114966 A1* | 6/2003 | Ferguson et al. ......... 701/29 |

(Continued)

FOREIGN PATENT DOCUMENTS

JP    61-14447    1/1986

(Continued)

OTHER PUBLICATIONS

International Search Report of International Application PCT/JP2004/012645 mailed Nov. 16, 2004.

*Primary Examiner*—Edward Raymond
*Assistant Examiner*—Mohamed Charioui
(74) *Attorney, Agent, or Firm*—Westerman, Hattori, Daniels & Adrian, LLP.

(57) ABSTRACT

Construction machinery is capable of prompting an operator to control or operate the machinery to improve fuel consumption. The fuel consumption per time or the fuel consumption per work amount is measured, and an image showing a difference between the measured fuel consumption per time and a set fuel consumption per time or between the measured fuel consumption per work amount and a set fuel consumption per work amount is displayed on a display device (30). When the measured fuel consumption per time is larger than the preset fuel consumption per time or the measured fuel consumption per work amount is larger than the set fuel consumption per work amount, an indication for prompting the operator to improve the fuel consumption is displayed on the display device (30).

19 Claims, 9 Drawing Sheets

U.S. PATENT DOCUMENTS

2003/0193406 A1* 10/2003 Kinugawa ............. 340/870.16
2005/0027423 A1*  2/2005 Minami et al. ............... 701/51

FOREIGN PATENT DOCUMENTS

| | | |
|---|---|---|
| JP | 5-86635 | 4/1993 |
| JP | 2534880 | 6/1996 |
| JP | 2000-088625 A | 3/2000 |
| JP | 2002-285890 | 10/2002 |
| WO | WO 93/06314 | 4/1993 |

* cited by examiner

8: PEDAL FOR ATTACHMENTS
9: SIDE WINDOW
10: INSTRUMENT PANEL
11: OPERATOR CAB
13: CAB SEAT
14: DRIVING OPERATION MEANS
15: DRIVING LEVER
16: DRIVING LEVER
17: DRIVING PEDAL
18: DRIVING PEDAL
19: WORKING MACHINE OPERATING LEVER
20: WORKING MACHINE OPERATING LEVER
21: LOCK LEVER
22: MONITOR DEVICE
23: FRONT WINDOW
24: EXTERNAL CASING
25: VERTICAL FRAME
26: MONITOR SCREEN
27: PUSH BUTTON
30: INDICATING MEANS

1: LOWER PORTION RUNNING UNIT
2: TURNING MECHANISM
3: UPPER PORTION TURNING UNIT
4: WORKING MACHINE

5: BOOM
6: ARM
7: BUCKET
11: OPERATOR CAB

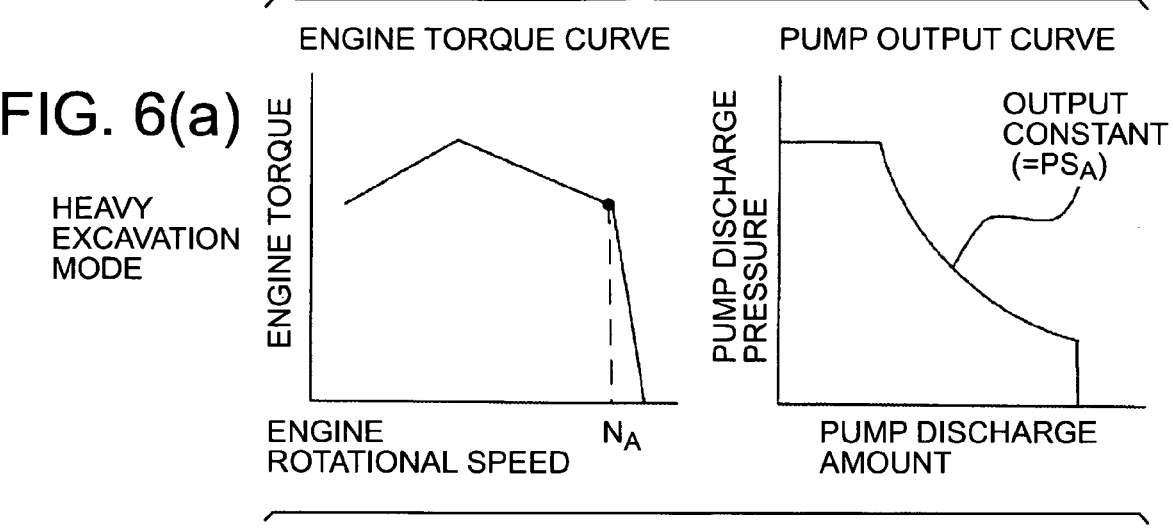
FIG. 6(a) HEAVY EXCAVATION MODE
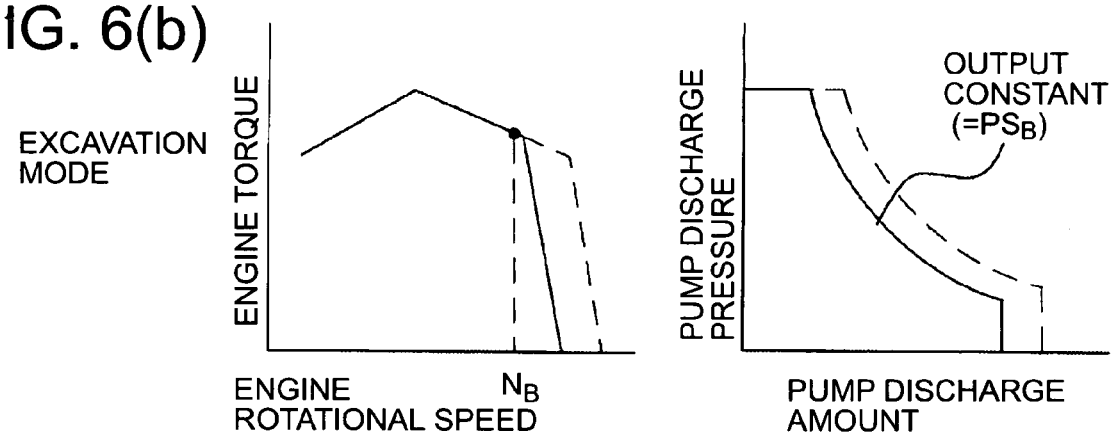
FIG. 6(b) EXCAVATION MODE
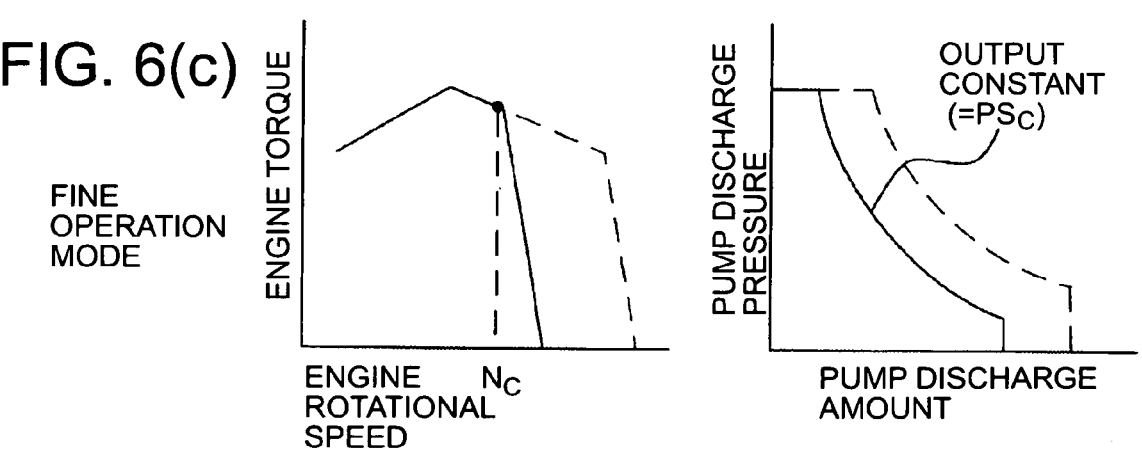
FIG. 6(c) FINE OPERATION MODE

FIG. 9

| WORK MODE | SET REFERENCE VALUE FOR FUEL CONSUMPTION PER TIME | SET REFERENCE VALUE FOR FUEL CONSUMPTION PER WORK |
|---|---|---|
| HEAVY EXCAVATION MODE | L11 | L12 |
| EXCAVATION MODE | L21 | L22 |
| FINE OPERATION MODE | L31 | L32 |
| COMMON MODE | L41 | L42 |

CONSTRUCTION MACHINERY

TECHNICAL FIELD

The present invention relates to construction machinery such as hydraulic power shovels or the like.

BACKGROUND ART

With a construction machine such as a hydraulic power shovel or the like, it is desirable to plan for enhancement of energy saving when driving the machine, or when performing various different types of work. Thus, in the prior art, such machines have been proposed, which can be changed over to energy saving driving when the actual fuel consumption (the actual fuel consumption ratio) does not reach a reference value (a fuel consumption ratio which is taken as a reference) (for example, refer to Patent Reference #1). Furthermore, there are such machines which are capable of calculating the work amount and the fuel consumption, and of analyzing whether the working efficiency is good or bad (for example, refer to Patent Reference #2).

In other words, with the construction machine 1 described in the above Patent Reference #1, the fuel which is actually consumed is calculated, and from this an actual fuel consumption is calculated as the fuel consumption amount per unit time. This actual fuel consumption is compared with a reference value which is set in advance, and, when the actual fuel consumption is less than its reference value, then changeover to energy saving driving is performed. Furthermore, with the construction machine described in Patent Reference #2, the work amount is detected by a detection device which consists of an engine rotational speed sensor, a fuel sensor, and a sensor for load detection or the like, and the work amount and the fuel consumption for a cycle time are calculated, whence the work amount per time and the work amount per fuel consumption are calculated; and this work amount per time and work amount per fuel consumption which have been calculated are printed out.

Patent Reference #1: Japanese Patent Laid-Open Publication 2002-285890 (claims 3 to 4, FIG. 1)

Patent Reference #2: Japanese Patent 2,534,880 (claims 3 to 4, FIG. 1)

In this manner, in the prior art, it has been possible to perform energy saving driving with a construction machine. However, with the construction machine as described in the above Patent Reference #1, although energy saving driving can be shifted to after the fuel consumption has become bad, it is not possible to shift to energy saving driving if the fuel consumption does not actually become bad. In other words, it becomes possible automatically to shift to energy saving driving when the fuel consumption during actual use has become bad. Furthermore, with the construction machine as described in the above Patent Reference #2, the work amount per time and the work amount per fuel consumption are only written (displayed) upon a report. Due to this, even if the operator looks at this report, he will not necessarily perform driving leading to improvement of the fuel consumption, and this does not make contribution to attainment of energy saving.

DISCLOSURE OF THE INVENTION

This invention has been conceived in order to eliminate the deficiency above described in the prior art, and its object is to provide a construction machine, which can prompt its operator to perform driving and operation for enhancement of the fuel consumption.

Thus, the construction machine of claim 1 is characterized by having indicating means (30) which measures a fuel consumption ratio and provides an indication for communicating a difference between the measured fuel consumption ratio and a set fuel consumption ratio.

With the above described construction machine of claim 1, since it is possible to indicate the measured difference between the fuel consumption ratio (for example, the fuel consumption ratio per time, or the fuel consumption ratio per work) which has been measured, and the set fuel consumption ratio which has been set on the indicating means 30, accordingly it is possible for the operator of the construction machine to recognize the difference or the like between the measured fuel consumption ratio and the set fuel consumption ratio. Due to this, the operator is able, based on this difference, to perform driving so as to bring the actual fuel consumption ratio close to the set fuel consumption ratio which has been set in advance.

And the construction machine of claim 2 is characterized in that, when the above described measured fuel consumption ratio is klarger than the above described set fuel consumption ratio, the above described indicating means (30) provides an indication for prompting an improvement of fuel consumption.

With the above described construction machine of claim 2, when the above described measured fuel consumption ratio is larger than the above described set fuel consumption ratio, the above described indicating means 30 provides an indication which prompts the operator to improve the fuel consumption. Due to this, the operator is able to recognize this indication to be prompted to improve the fuel consumption.

And the construction machine of claim 3 is characterized in that the above described indication for prompting the improvement of fuel consumption includes a display which is displayed on a monitor screen (26) which is provided in an operator cab (11) of the above described construction machine.

With the above described construction machine of claim 3, since the display prompting to improve the fuel consumption can be displayed on the monitor screen 26 provided within the operator cab 11, it is possible for an operator in the operator cab 11 to detect this display easily.

And the construction machine of claim 4 is characterized in that the indication for prompting the improvement of fuel consumption includes a voice presentation by a voice generator which is provided in the operator cab (11).

With the above described construction machine of claim 4, the operator is able to recognize the indication prompting to improve the fuel consumption via a voice presentation by a voice generator. In other words, he is able to recognize the above described indication prompting to improve the fuel consumption aurally, while the operator keeps looking forward through the front window, without having to look at the monitor screen 26.

The construction machine of the above described claim 5 comprises: measurement means (31, 32, 33) which measures a fuel consumption ratio; storage means (52) which stores a plurality of reference fuel consumption ratios which are set in advance, corresponding to different work loads; selection means (53) which selects a reference fuel consumption ratio which corresponds to the work load, from the above described storage means; comparison means (53) which compares the fuel consumption ratio measured by the above described measurement means and the reference fuel consumption ratio selected by the above described selection means; and output means (30) which outputs the result of comparison by the above described comparison means.

And the construction machine of the above described claim 6 further comprising: control means which has a plurality of selective work modes having respectively different reference load values, and controls an operation of the construction machine so that a work load thereof matches the reference load value corresponding to a selected work mode, wherein the storage means stores the reference fuel consumption ratios which correspond to the work modes; and the selection means selects a reference fuel consumption ratio which corresponds to the selected work mode.

According to the construction machine of claim 1, the operator is able to perform driving so as to bring the actual fuel consumption ratio close to the set fuel consumption ratio which has been set in advance. Due to this, the fuel consumption can be improved.

According to the construction machine of claim 2, the operator is able to recognize the indication prompting to improve the fuel consumption, and to perform driving so as to improve the fuel consumption.

According to the construction machine of claim 3, while driving the vehicle to travel or perform various types of work (for example, excavation or the like using the working machine), the operator is able to recognize the display prompting to improve the fuel consumption by visual inspection of the monitor screen, and to make an effort to perform driving or operation for improving the fuel consumption so that it is possible to contribute to energy saving.

According to the construction machine of claim 4, the operator is able to recognize aurally the above described indication prompting to improve the fuel consumption, while the operator keeps looking forward through the front window, without having to look at any monitor screen. The operator can concentrate on the operation of driving and perform the operation in a stable manner.

According to the construction machine of claim 5, according to the work load (for example, the work ratio) of the construction machine, it is possible to compare the actually measured value of the fuel consumption ratio with the respective different reference value according to the work load (for example, the work ratio) of the construction machine, and to prompt the operator to perform driving so as to improve the fuel consumption more effectually.

According to the construction machine of claim 6, the construction machine has a plurality of selectable work modes for which the reference load values are different, selects one of the work modes, and then compare the actually been measured fuel consumption ratio with the reference fuel consumption ratio which corresponds to the selected work mode.

BRIEF DESCRIPTION OF THE DRAWINGS

FIGS. 6(a) to 6(c) show explanation of the characteristics of various work modes;

FIG. 9 is a table of set reference values of fuel consumption, stored in storage means;

BEST MODE FOR CARRYING OUT THE INVENTION

Figure 2:
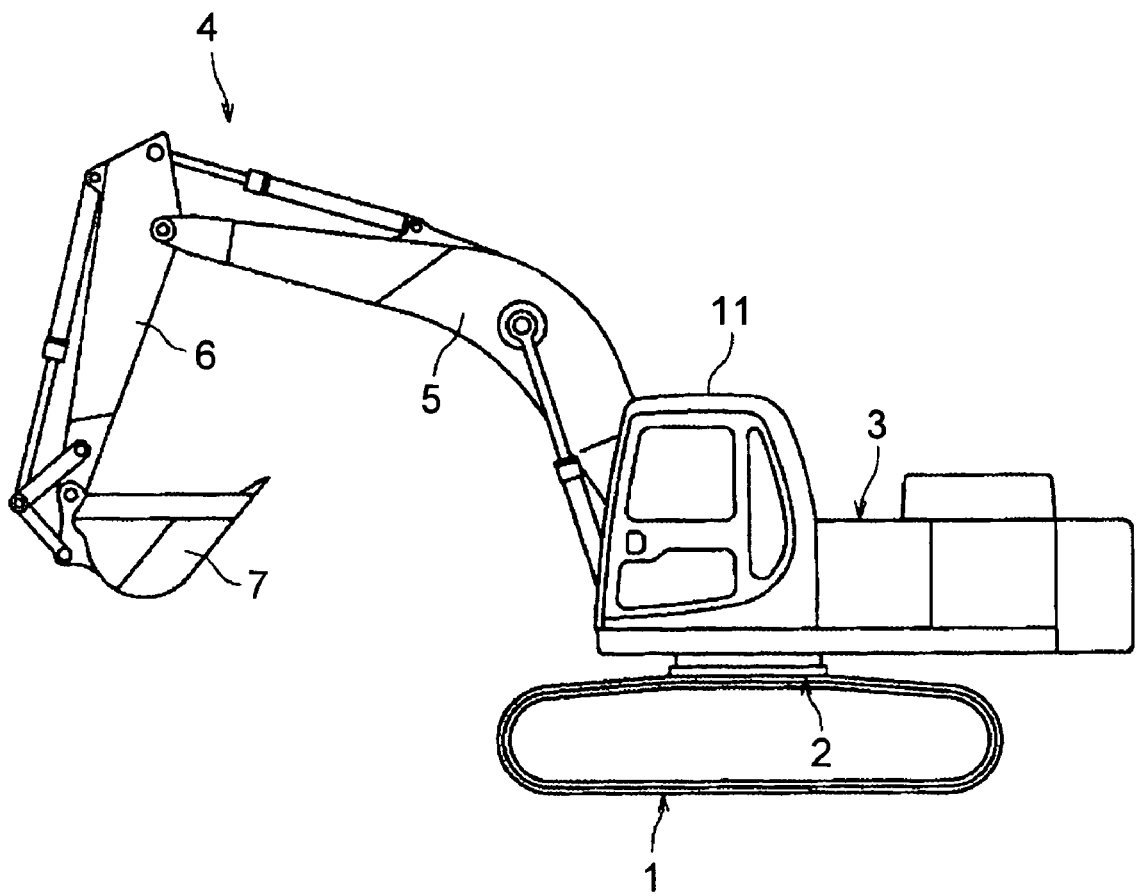
FIG. 2 is an overall outline view of the above described construction machine.

Concrete embodiments of the construction machine of this invention will be explained below in detail with reference to the drawings. FIG. 2 is an overall view of this construction machine. This construction machine is a hydraulic power shovel, and comprises a lower portion running unit 1, an upper portion turning unit 3 which is mounted via a turning mechanism 2 on the upper portion of the lower portion running unit 1, so as to be rotatable thereon; and a working machine 4 is mounted on this upper portion turning unit 3. This working machine 4 comprises a boom 5 whose base portion is pivotally coupled to the upper portion turning unit 3, an arm 6 which is pivotally coupled to the end of the boom 5, and a bucket 7 which is pivotally coupled to the end of the arm 6. Furthermore, an operator cab 11 and so on are provided on the upper portion turning unit 3.

Figure 1:
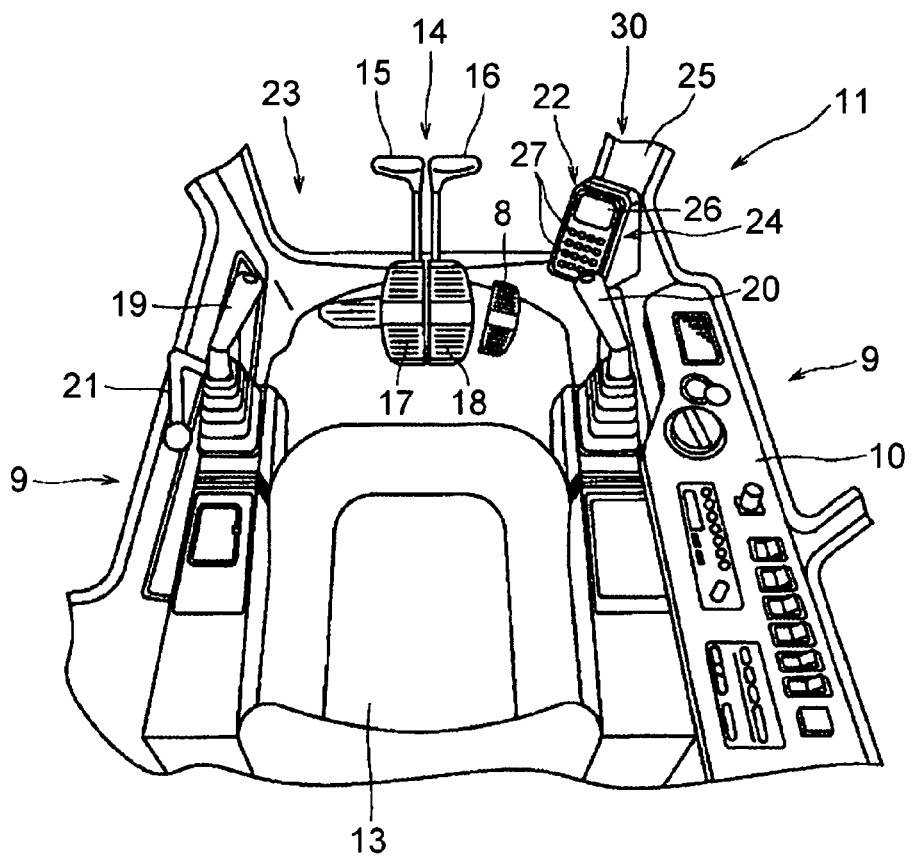
FIG. 1 is a schematic perspective view showing an embodiment of the construction machine according to this invention.

In the central portion of the operator cab 11 of the upper portion turning unit 3, as shown in FIG. 1, there is provided a cab seat 13, and driving operation means 14 is provided in front of this cab seat 13. This driving operation means 14 comprises driving levers 15 and 16, and driving pedals 17 and 18 which are pivoted integrally with these driving levers 15 and 16. In this case it is so arranged that, when the driving levers 15 and 16 are pushed forward, the lower portion running unit 1 drives forward, while, when the driving levers 15 and 16 are pulled backwards, the lower running unit 1 drives in reverse. It should be understood that a pedal 8 for attachments is provided in the neighborhood of the driving operation means 14, and furthermore an instrument panel 10 is provided near one side window 9.

Furthermore, working machine operating levers 19 and 20 are provided at the sides of the cab seat 13. The above described working machine operating levers 19 and 20 are for performing raising and lowering of the boom 5, rotation of the arm 6 and of the bucket 7, turning operation of the upper portion turning unit 3 itself, and the like. Moreover, a lock lever 21 is provided in the neighborhood of the working machine operating lever 19 on one side. Here, by a lock lever 21, is meant a device for stopping functions such as operation of the working machine 4, turning of the upper portion turning unit 3, running of the lower portion running unit 1, and so on. In other words, it is possible to Lock the operation of the working machine 4 by performing pulling upward operation of the lock lever 21, and, in this state, it is possible to ensure that the working machine 4 and so on cannot be operated, even if the working machine operating levers 19 and 20 and so on are operated.

Furthermore, a monitor device 22 which displays the state of the engine and the like is provided within the operator cab 11 of this construction machine. Here by the state of the engine, is meant, for example, the temperature of the engine cooling water, the engine oil temperature, the remaining fuel amount, and so on. It should be understood that this monitor device 22 is disposed on the lower portion of a vertical frame 25 which partitions between the front window 23 and one of the side windows 9 of the operator cab 11, and, on the front surface of its external casing 24, there are provided a monitor screen 26 and push buttons 27 . . . for operation. Moreover, it should be understood that this monitor screen 26, for example, may consist of a liquid crystal panel.

Figure 3:
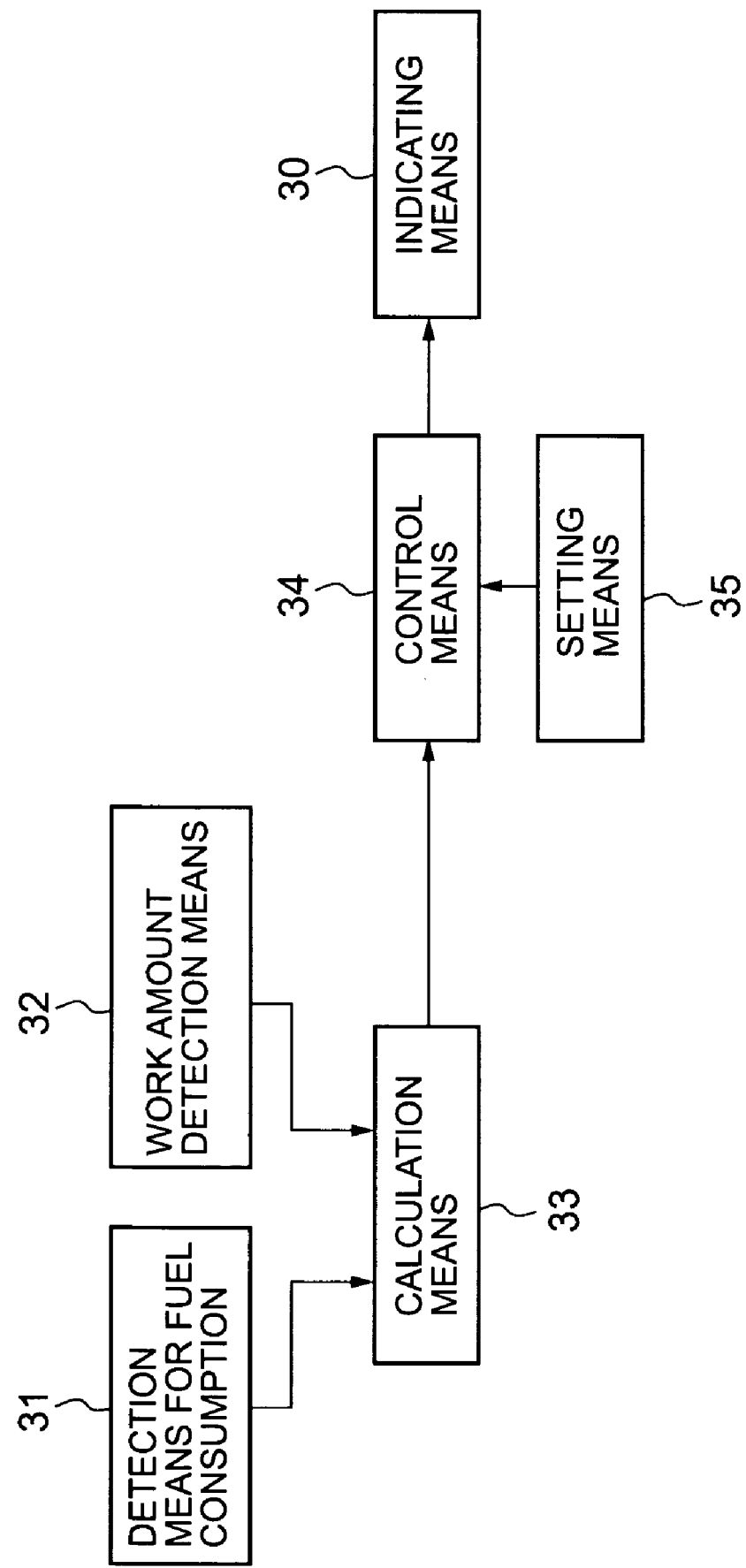
FIG. 3 is a block diagram of a control circuit according to a first embodiment of the above described construction machine.

Now, this construction machine comprises a control circuit shown in FIG. 3. And the fuel consumption ratio per unit time (hereinafter termed the fuel consumption per time), or the fuel consumption ratio per unit amount of work (hereinafter termed the fuel consumption per work), is measured by this control circuit, and, with indicating means 30, it is possible to provide a display from which it is possible to know the difference between the fuel consumption per time which has been measured, and a fuel consumption per time which has been set, or the difference between the fuel consumption per work which has been measured, and a fuel consumption per work which has been set. This control circuit comprises detection means for fuel consumption 31, work amount detection means 32, calculation means 33 into which are inputted the detected values which have been detected by these detection means 31 and 32, control means 34 into which the result of calculation by the calculation means 33 is inputted, setting means 35 which sets a reference value for the fuel consumption per time and a reference value for the fuel consumption per work (i.e. reference fuel consumptions), and the like. Furthermore, the indicating means 30 consists of the above described monitor device 22, and the difference between the above described fuel consumption per time which has been measured and the fuel consumption per time which has been set, and so on, are displayed on this monitor screen 26.

Figure 4:
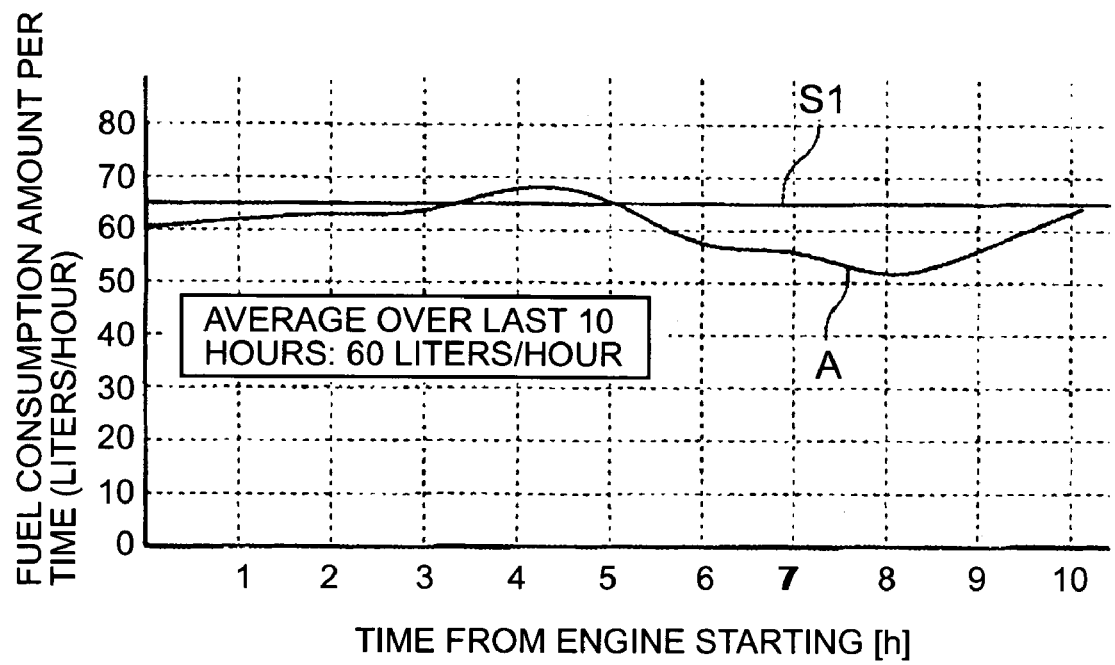
FIG. 4 is a graph showing fuel consumption amount per unit time.
Figure 5:
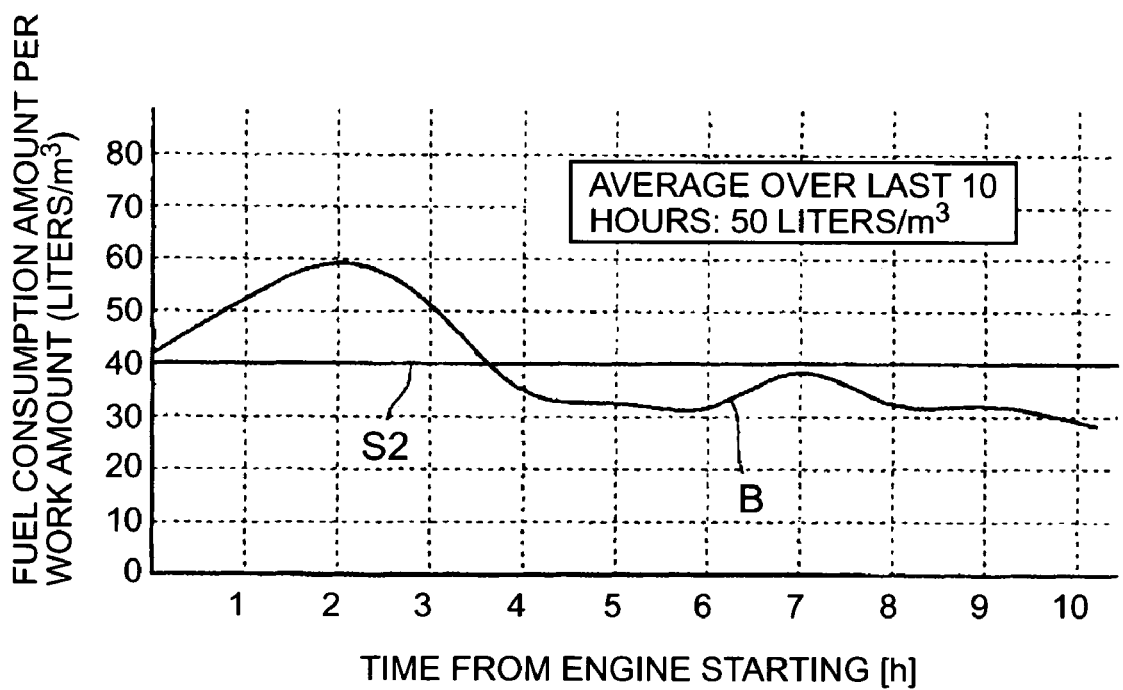
FIG. 5 is a graph showing fuel consumption amount per unit work amount.

In other words, this monitor device 22 constitutes the indicating means 30, and, on its monitor screen 26, apart from the above described engine state it is possible to display, as shown in FIG. 4, the difference between the fuel consumption per time A which has been measured (its actually measured value) and the fuel consumption per time Si which has been set (its set reference value); or it is possible to display, as shown in FIG. 5, the difference between the fuel consumption per work B which has been measured (its actually measured value) and the fuel consumption per work S2 which has been set (its set reference value); and the like. At this time, in FIG. 4, there is shown a graph with time displayed along the horizontal axis, and the fuel consumption per time (in liters/hour) displayed along the vertical axis. Furthermore, in FIG. 5, there is shown a graph with time displayed along the horizontal axis, and the fuel consumption per work (in liters/m$^3$) displayed along the vertical axis.

The detection means for fuel consumption 31 may consist of a fuel sensor which detects the flow amount of fuel flowing, for example, in a fuel supply conduit, or the like. The detected value from this detection means for fuel consumption 31 is inputted to the calculation means 33, and, therein, the fuel consumption per time is calculated. Furthermore, the work amount detection means 32 may consist of a sensor which detects the loading amount of the bucket, or the like. For example, for the work amount during loading, the loading amount of the bucket may be detected by a monitor camera or the like, and it may be obtained as (loading amount·number of times/time), or the like; and, furthermore, for the work amount during transportation, it maybe obtained by (loading weight·distance), or the like. And the work amount which is detected by the work amount detection means 32 is inputted to the calculation means 33, and therein, the fuel consumption per work is calculated. It should be understood that it would also be acceptable, when detecting this work amount, not to use a sensor, but to arrange to detect the loading amount of the bucket by visual inspection by an operator.

Here, by the fuel consumption per time which has been set, is meant a fuel consumption per time which is set in advance by a manager or the like; for example, with an 80 ton class hydraulic power shovel, during heavy work which is performed at an 80% rating, this may be set to around 65 (liters/hour), while, during medium work which is performed at a 65% rating, it may be set to around 50 (liters/hour), and, during light work which is performed at a 50% rating, it may be set to around 40 (liters/hour). Furthermore, by the fuel consumption per work which has been set, is meant a fuel consumption per work which is set in advance by a manager or the like; for example, this may be set to around 40 (liters/m$^3$).

Accordingly, with a construction machine constructed as described above, when performing work, the fuel consumption per time or the fuel consumption per work is calculated, this is compared with the setting which has been set with the setting means 35, and the difference between them is displayed on the monitor screen 26. At this time, for example, as shown in FIG. 4, a graph may be displayed for the fuel consumption per time. In other words, along with the actually measured value A being displayed, the set reference value S1 (65 liters/hour) is displayed. In this FIG. 4, the average of the actually measured value A over 10 hours is 60 (liters/hour). Furthermore, for example, as shown in FIG. 5, for the fuel consumption per unit work, along with the actually measured value B being displayed, the set reference value S2 (40 liters/m$^3$) is displayed. In this FIG. 5, the average over 10 hours is 50 (liters/m$^3$). And, when the set reference value for the fuel consumption per time is exceeded, or when the set reference value for the fuel consumption per work is exceeded, display of guidance for encouraging improvement of fuel consumption is performed on the above described monitor screen 26. For this display of guidance for encouraging improvement of fuel consumption, "Fuel Consumption is High" or the like maybe displayed.

In this manner, during work, an operator in the operator cab 11 is able to detect the difference between the actual fuel consumption per time and the fuel consumption per time which has been set in advance, or the like. By doing this, based on this difference, the operator is able to make efforts to perform driving so as to bring the actual fuel consumption closer to the fuel consumption which has been set in advance. In particular, since, when the set reference value for the fuel consumption per time or the like is exceeded, a display of "Fuel Consumption is High" or the like is provided, accordingly the operator is able to ascertain that the work or the like, which is currently being performed, is not being performed with good working efficiency, and he is enabled immediately to take measures to perform driving operation in order to enhance the fuel consumption. By the way, when driving, although the speed becomes slower if the engine rotational speed is lowered, the fuel consumption becomes better. Furthermore, by lowering the engine rotational speed, it is possible to drive with good efficiency by enhancing the fuel efficiency (the distance covered per one liter of fuel). Due to this, operation to lower the engine rotational speed when driving is a type of driving operation which leads to improvement. Furthermore, if the engine is brought to its maximum rotational speed when using the working machine 4 for the work of excavating earth and sand, then the working speed is fast, and the output becomes maximum, but the fuel consumption is high. By contrast to this, if the rotational speed of the engine is lowered, although the working speed and the output are reduced, along with the fuel consumption amount becoming lower, the fuel consumption efficiency is enhanced. Due to this, operation to reduce the engine rotational speed is a type of operation which leads to improvement during the work of excavating earth and sand. Furthermore, since the fuel consumption becomes high if the turning angle of the working machine is large, accordingly, in some cases, advice is also displayed to reduce the turning angle.

Since, with the construction machine having the above described type of structure, by visual inspection of the monitor screen 26, the operator is able, during driving of the vehicle and also during various types of work, to become aware of the above described display which encourages him/her to improve the fuel consumption, accordingly, during driving or during working (for example, when the working machine is being used during excavation or the like), it is possible for him/her to make an effort so as to perform driving or operation while trying to enhance the fuel consumption, and thus it is possible to make a contribution towards the attainment of improved energy saving. Moreover, it is also possible to make the detection means and the control means of a simple structure, so that it is also possible to achieve a reduction of the cost. By the way although, as in the above described embodiment, it was arranged to perform the display which prompts the operator to improve the fuel consumption or the like on the monitor screen 26 of a monitor device 22 which is fitted to this type of construction machine from the past, it would also be acceptable to provide a separate dedicated monitor device which is completely different from this type of already existing monitor device 22, and to arrange to display on this dedicated monitor device the guidance for operation directed towards improvement of the fuel consumption or the like.

Furthermore, as another embodiment, a voice generator (not shown in the figures) may be provided in the operator cab 11, and it may be arranged to provide the guidance for prompting the improvement of fuel consumption by emitting a voice from this voice generator. At this time, it would be possible only to employ voice presentation via this voice generator; or it would also be acceptable to use it together with the above described monitor display. In the case of voice presentation, the operator is able to become aware of the above described guidance while still looking forward through the front window 23 or the like, so that he is able to concentrate on the action of driving, and is able to perform operation and the like in a stable manner. However, with voice presentation, due to noise and the like in the workplace, it may happen that it is difficult to hear and appreciate the guidance, and it is possible to convey the guidance with the above described monitor display in this type of case as well. Due to this, if both voice presentation and monitor display are provided together, it is possible for the operator to be reliably informed of the guidance.

And, as another embodiment, it is possible to arrange for it to be possible to change over the indicating means 30 between an ON state in which it displays the above described type of guidance, and an OFF state in which it does not display this type of guidance. In other words, for example, in the case of monitor display, it is possible to perform changing over by operating the push button 27 of the monitor device 22. Furthermore, in the case of voice presentation as well, it is possible to perform changing over by providing a switch or the like which changes over the voice generator. In this manner, if it is possible to change over between an ON state in which guidance is presented, and an OFF state in which guidance is not presented, then, since it is possible to put the indicating means 30 into the OFF state when no consideration is being given to the enhancement of fuel consumption, or the like, accordingly it is possible for the operator to concentrate on driving operation or operation of the working machine, without any guidance being provided via the monitor display or via the voice display. Furthermore, if it is desired to perform operation to prompt the improvement of fuel consumption, then, if the indicating means 30 is put into the ON state, it is possible to present guidance for prompting the improvement of fuel consumption via the monitor display or a voice display or the like, so that the operator becomes able to make an effort so as to perform driving or operation with a view to the enhancement of the fuel consumption. It should be understood that, in a case in which it is made possible to change over the indicating means 30 between ON and OFF, even though the calculation of the fuel consumption per unit time and the like are initially started when the indicating means 30 is put into the ON state, it would also be acceptable to calculate the fuel consumption per unit time and so on when the engine of this construction machine is started, irrespective of whether the indicating means 30 is ON or OFF, and to arrange to provide the above described display which prompts the operator to improve the fuel consumption via the monitor display or via the voice presentation, when the indicating means 30 is put into the ON state.

Next, a second embodiment of the present invention will be explained. In the following explanation, the points of difference from the first embodiment will be focused on, and to structural elements or functions which are the same as in the first embodiment, the same reference symbols will be affixed, and their explanation will be curtailed.

With this embodiment, a hydraulic power shovel will be explained as an example, just as in the case of the first embodiment. In the hydraulic power shovel of this embodiment, there are provided a plurality of work modes which indicate the type of the basic work, in each of which the work load is different. In this embodiment, for example, there are the work modes "heavy excavation mode", "excavation mode", and "fine operation mode". When performing work, the operator him/herself is able to select any one of these work modes according to the details of the work which is to be performed. With the hydraulic power shovel of this embodiment, various different types of control are performed, according to the work mode which has been selected. Although a summary of each of the work modes is as given below, with regard to the detailed control procedures, since they are described in Japanese Patent 2,670,815, reference should be made thereto.

The "heavy excavation mode" is a work mode for performing excavation work in which the load is great, and, when its operational characteristics are shown using an engine torque curve and a pump output curve, they are as shown in FIG. 6(a). In other words, the engine rotational speed operates so as to be almost constant at $N_A$, and the output of the pump (horsepower) also operates so as to be constant at $PS_A$.

The "heavy excavation mode" is a work mode for performing excavation work in which the load is medium, and, when its operational characteristics are shown using an engine torque curve and a pump output curve, they are as shown in FIG. 6(b). The curves shown with the broken lines are the curves for the heavy excavation mode. In other words, the engine rotational speed operates so as to be almost constant at $N_B$, and the output of the pump also operates so as to be constant at $PS_B$.

The "fine operation mode" is a work mode for performing comparatively fine operation when the load is small, and, when its operational characteristics are shown using an engine torque curve and a pump output curve, they are as shown in FIG. 6(c). The curves shown with the broken lines are the curves for the heavy excavation mode. In other words, the engine rotational speed operates so as to be almost constant at $N_C$, and the output of the pump also operates so as to be constant at $PS_C$.

As is clear from the above described operational characteristics of each of the work modes, the torque and the output when performing work in each of the work modes are different. In correspondence thereto, the fuel consumption also differs for each of the work modes. Accordingly, it is appropriate for the reference fuel consumption also to be set to different values for each of the work modes. Thus, in this embodiment, the set reference value for the fuel consumption (hereinafter sometimes simply termed the "reference value") is set to a value according to the work mode which has been selected, and it is arranged to compare it with the actually measured value of the fuel consumption, which has been obtained by measurement.

Figure 7:
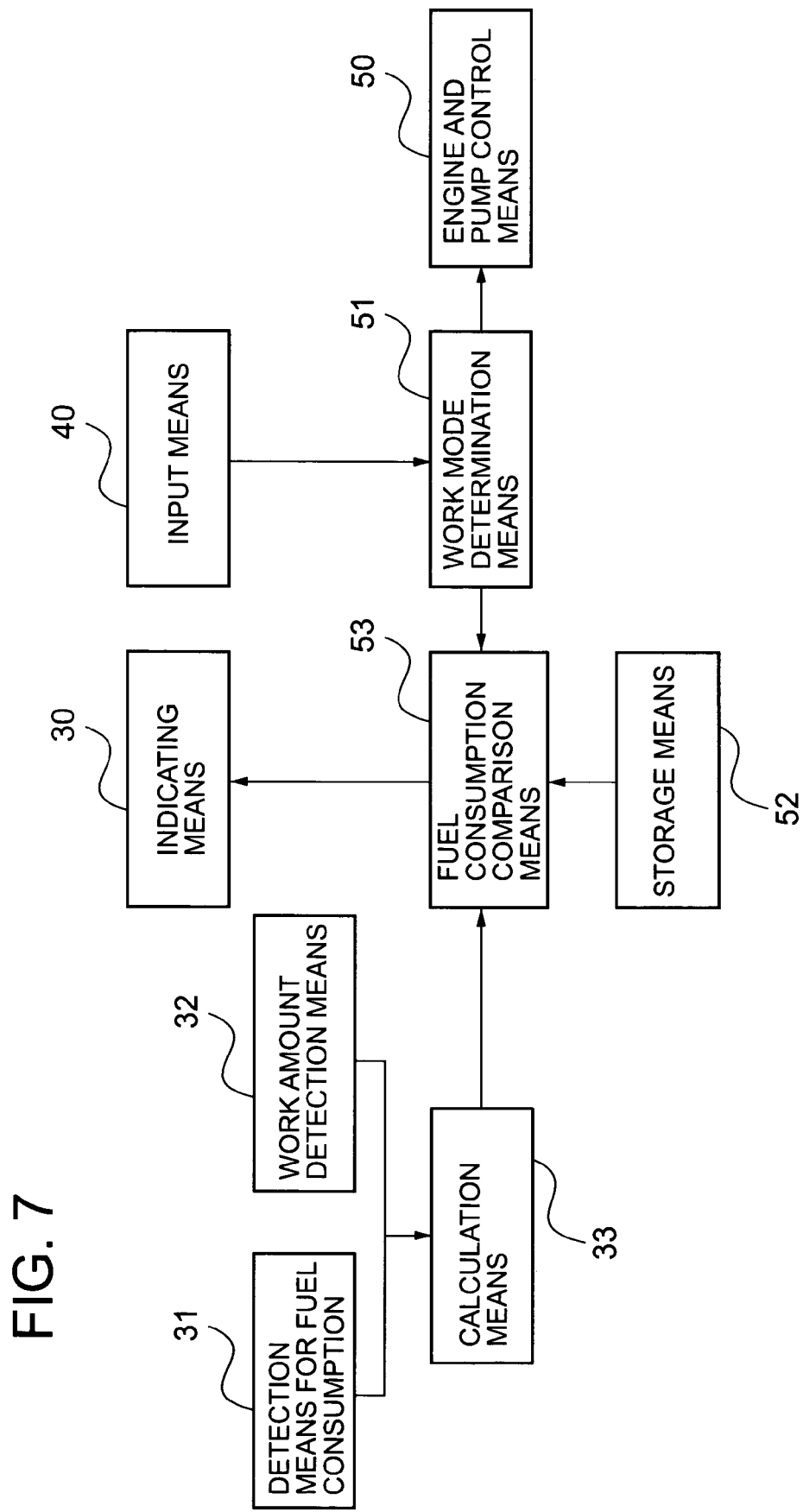
FIG. 7 is a block diagram of a control circuit according to a second embodiment of the above described construction machine.

With the hydraulic power shovel according to this embodiment, a control circuit as shown in FIG. 7 is incorporated. In other words, this control circuit comprises: detection means for fuel consumption 31, which measures the fuel consumption amount in order to calculate the fuel consumption per time; work amount detection means 32, which measures the work amount in order to calculate the fuel consumption per work; calculation means 33 for calculating the fuel consumption per time and the fuel consumption per work, based on the results of measurement by the detection means for fuel consumption 31 and the detection means for work amount 32; and indicating means 30 for displaying the result of comparing the actually measured values of the fuel consumption per time and of the fuel consumption per work with their respective reference values. These various means 31, 32, 33, and 30 are the same components as in the first embodiment. The control circuit of this embodiment further comprises: input means 40 which receives selection input of work mode and the like from the operator; engine and pump control means 50 which performs control of the engine and the pump; reference value determination means 51 which determines the reference values to be used in fuel consumption comparison, based on the information which has been received by the input means 40; storage means 52 which stores reference values for the various different modes and the like, and fuel consumption comparison means 53 which compares the fuel consumption per time and the fuel consumption per work which have actually been measured with their respective reference values, and decides whether the actually measured values are less than or equal to the reference values.

Figure 8:
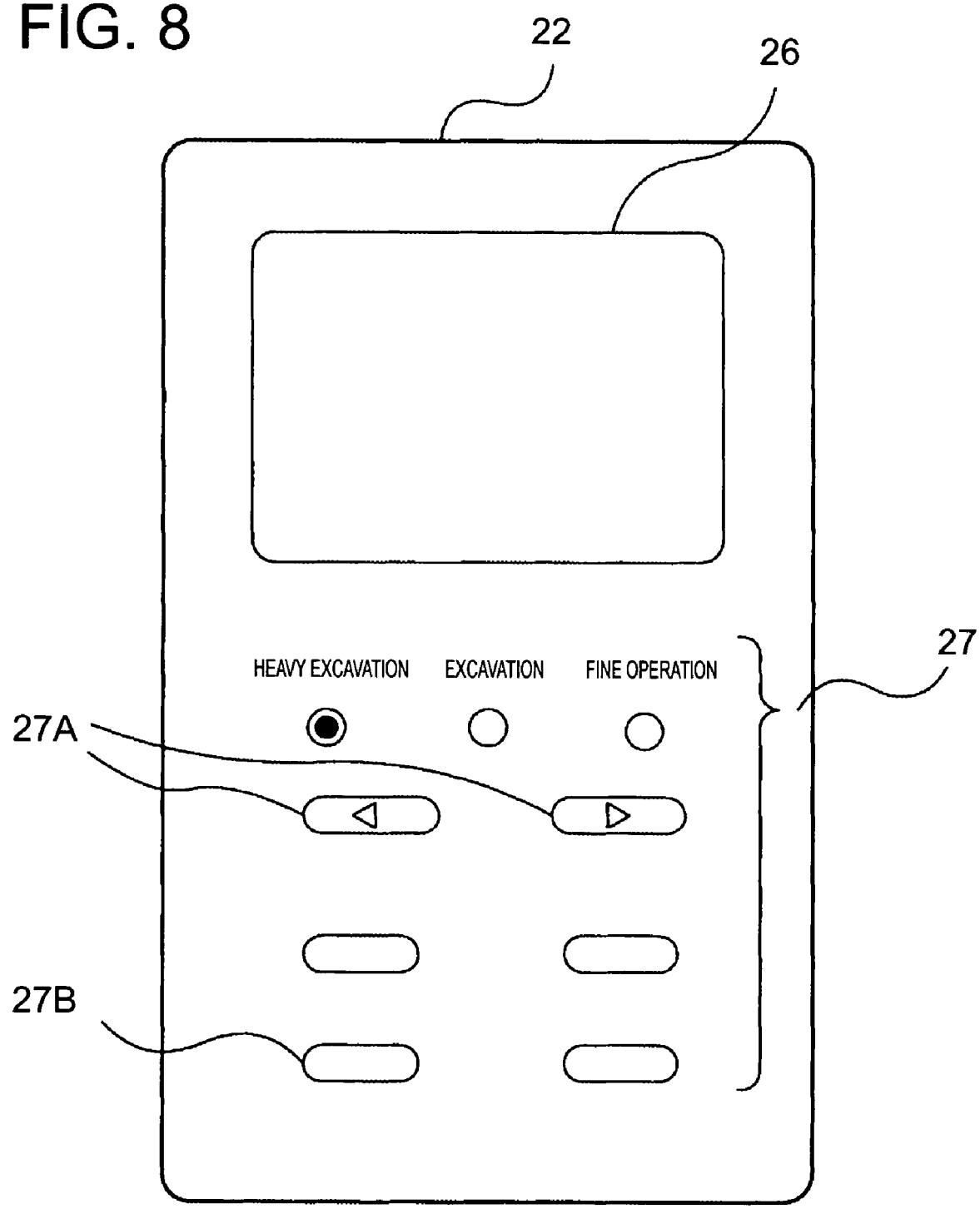
FIG. 8 is an elevation view of a monitor device.

The input means 40, for example, is made up by push buttons 27 on the monitor device 22 (refer to FIG. 1). Here, an elevation view of the monitor device 22 is shown in FIG. 8. This monitor device 22 comprises a monitor screen 26, which is the indicating means 30, and a plurality of push buttons 27. Among this plurality of push buttons 27, there is a work mode selection button 27A for selecting the work mode. The operator selects the work mode by using this work mode selection button 27A. And this input means 40 notifies the work mode which has been selected by operation by the operator to the reference value determination means 51.

In this embodiment, as will be described hereinafter, in correlation with the selection of the work mode, the respective reference values which correspond to the work mode which has been selected are set to the reference values of the fuel consumption per time and the fuel consumption per work, and comparison is performed thereof with the actually measured fuel consumption. On the other hand, it would also be possible to set fixed reference values irrespective of the work mode, and to perform comparison thereof with the actually measured fuel consumption. Whether or not correlation with the work mode is to be performed, is selected with a mode correlation/non correlation selection button 27B which is provided in advance on the monitor device 22. And the input means 40 notifies to the reference value determination means 51, which of work mode correlation or non correlation has been selected with the mode correlation/non correlation selection button 27B.

The set reference values for the fuel consumption are stored in the storage means 52. For example, a table T may be stored in the storage means 52, as shown in FIG. 9. In this table T, there are stored, for each work mode, set reference values L11 through S31 for the fuel consumption per time, set reference values L12 through L32 for the fuel consumption per work, and set reference values L41 and L42 for a common mode. These values may be set as desired by a work manager, or the like.

Returning to FIG. 7, the explanation will now be continued. The reference value determination means 51 receives notification from the input means 40, and commands the fuel consumption comparison means 53 to select a reference value. For example, when the reference value determination means 51 has received notification from the input means 40 that work mode non correlation has been selected by the mode correlation/non correlation selection button 27B, it notifies the fuel consumption comparison means 53 to that effect. Furthermore, when work mode correlation has been selected by the mode correlation/non correlation selection button 27B, the reference value determination means 51 notifies the work mode which has been selected by the work mode selection button 27A to the engine and pump control means 50 and to the fuel consumption comparison means 53.

Upon receipt of this notification from the reference value determination means 51, the engine and pump control means 50 performs engine control and pump control, so as to operate the hydraulic power shovel at a power which corresponds to this work mode which has been notified.

For either one, or for both, of the fuel consumption per time and the fuel consumption per work which have been calculated by the calculation means 33, the fuel consumption comparison means 53 compares together the respective actually measured value(s) and the reference value(s). Here, the fuel consumption comparison means 53 functions as selection means which selects the reference value(s) which are used in this comparison from the storage means 52, based upon the notification from the reference value determination means 51. For example, when a notification of work mode non correlation has been received from the reference value determination means 51, then the reference values L41 and L42 for the common mode are selected and acquired from the storage device 52, and are used as reference values for the fuel consumption comparison. On the other hand, when a notification of a work mode has been received from the reference value determination means 51, then the set reference values of the fuel consumption per time and of the fuel consumption per work which correspond to the work mode which has been notified are selected and acquired from the storage device 52, and are used as reference values for the fuel consumption comparison.

And, when the result of this comparison is that the actually measured value(s) are larger than the reference value(s), then the fuel consumption comparison means 53 commands the indicating means 30 to display this comparison result. The display state for the comparison result may assume any of various different forms; for example, it would be acceptable to output a predetermined message in order to prompt the operator to improve the fuel consumption, and to warn the operator; or, it would also be acceptable, as in the first embodiment, to display a graph like the one shown in FIG. 4 on the indicating means 30. Furthermore, in the same manner as with the first embodiment, apart from the display on the indicating means 30, it would also be acceptable to notify the operator via different output means, such as via voice or the like.

Figure 10:
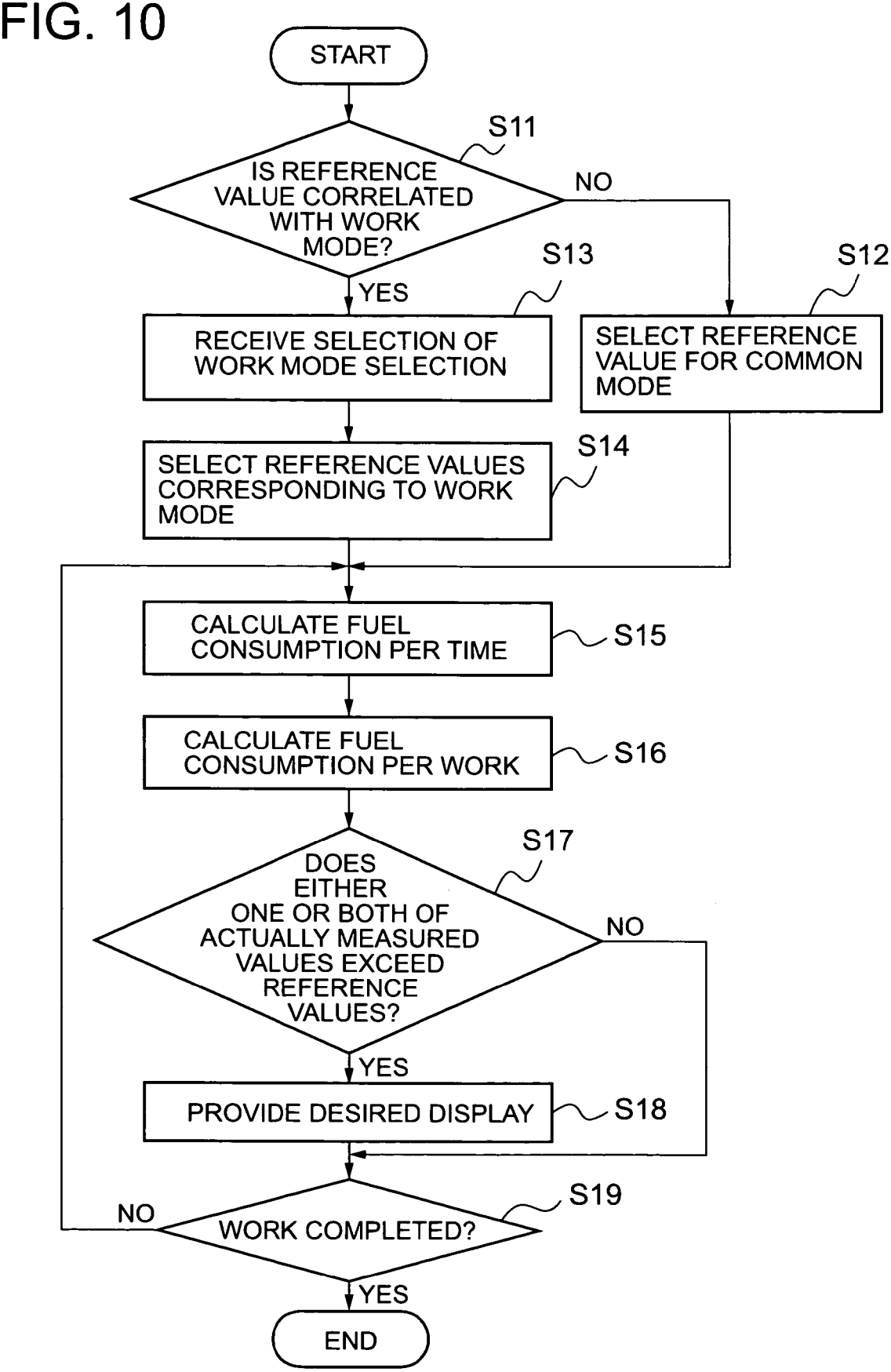
FIG. 10 is a flow chart showing the procedural flow of the second embodiment.

Next, the procedural flow for performing the comparison of the fuel consumption per time and the fuel consumption per work will be explained according to the flow chart shown in FIG. 10.

First, the operator operates the mode correlation/non correlation selection button 27B of the input means 40, and selects whether or not the reference values for the fuel consumption will be correlated with the work mode. When the work mode determination means 51 receives a notification from the input means 40 to the effect that work mode non correlation has been selected, then it notifies this to the fuel consumption comparison means 53 to that effect, and the fuel consumption comparison means 53 refers to the storage means 52, and selects the set reference values (L41 and L42) of the fuel consumption per time and of the fuel consumption per work for the common mode (S11: NO; S12).

On the other hand, when the work mode determination means 51 receives a notification from the input means 40 to the effect that work mode correlation has been selected (S11: YES), then it further receives a notification of the mode which has been selected with the work mode selection button 27A of the input means 40 (S13). The work mode determination means 51 notifies the work mode that has been selected to the fuel consumption comparison means 53, and the fuel consumption comparison means 53 refers to the storage means 52, and selects the set reference values of the fuel consumption per time and of the fuel consumption per work which correspond to the work mode (S14). With this, the initial setting is completed.

And, after the initial setting has been completed, in the same manner as in the case of the first embodiment, the calculation means 33 calculates the fuel consumption per time, based on the fuel consumption amount within a predetermined time period which has been measured by the detection means for fuel consumption 31 (S15) Furthermore, the calculation means 33 calculates the fuel consumption per work, based on the fuel consumption amount within a predetermined time period which has been measured by the detection means for fuel consumption 31, and on the detection means for work amount 32 (S16).

The fuel consumption comparison means 52 compares (S17) the actually measured values of the fuel consumption per time and of the fuel consumption per work which were calculated in the steps S15 and S16, with the respective reference values which were selected in the step S11 or the step S14. And, when the actually measured value of either one thereof, or of both thereof, exceeds the reference value (S17: YES), then a warning such as a display or the like which prompts the operator to improve the fuel consumption is displayed on the indicating means 30 (S18). If both of the actually measured values are less than or equal to their reference values (S17: NO), then this step S18 is skipped.

And the procedures from the step S15 through the step S18 are repeated until the work is completed (S19).

By doing this, for the reference values which are compared with the actually measured values of the fuel consumption per time and of the fuel consumption per work, it is possible to set reference values corresponding to the work mode. By comparing reference values which differ according to the work mode, with the actually measured values, it is possible to instruct the operator to improve the fuel consumption in an efficient manner. Moreover, by only selecting the work mode, it becomes possible to set the reference values in correlation therewith. Furthermore, it is also possible for the operator him/herself to select whether or not the setting of the reference values for fuel consumption is to be correlated with the work mode.

Although concrete embodiments of this invention have been explained above, this invention is not to be considered as being limited to the above described embodiments; within the range of this invention, it is possible to implement various changes. For example, as far as the position of the monitor device 22 is concerned, it is desirable for this to be a position with which, when the operator sits in the cab seat 13 and drives this construction machine, or performs work using the working machine 4, he is able to observe this monitor screen 26; but it is not to be considered as being limited to the position of FIG. 1. Furthermore it would also be acceptable, when performing monitor display, to display numerical values only, without making them into graphs as shown in FIG. 4 and FIG. 5. If a display on a monitor is provided as the display which prompts the operator to improve the fuel consumption, then it is acceptable for this display to be characters only; or if a drawing is displayed for prompting the operator to improve the fuel consumption, then it would also be acceptable to display only this drawing. Yet further, as the measurement of the fuel consumption, it would also be acceptable to perform it every predetermined time period (for example, 15 minutes), or to perform it regularly; and, as for the display, it would be acceptable to provide it every predetermined time period, or to provide it regularly, together with the measurement. Still further, it would be possible for the set reference value for the fuel consumption per time and the set reference value for the fuel consumption per work to be set as desired by a works manager or the like. Even further, with regard to the display, it would be possible only to provide a display relating to the fuel consumption per time, or only to provide a display relating to the fuel consumption per work; or it would be possible to provide a display relating to both the fuel consumption per time and the fuel consumption per work. Still further, it would be acceptable to provide setting means 35 (refer to FIG. 3) or the like externally to the machine, and to set, with the above described setting means 35, set values (the set reference value for the fuel consumption per time and the set reference value for the fuel consumption per work) which are standard values for driving operation with good efficiency, by arranging to transmit those set reference values to the construction machine by using, for example, satellite communication means or the like; or, it would also be acceptable to calculate the work amount and so on for this construction machine externally to the machine, and to transmit this calculated value (the actual work amount), or a fuel consumption per work or the like which has been calculated based on this calculated value, to the construction machine by using the above described satellite communication means or the like. If various types of data (information) are transmitted from externally to the construction machine in this manner, then it is possible to reduce the number of devices which are mounted to the construction machine, so that it is possible to anticipate simplification of the machine, and moreover, it is possible to set the timing of transmitting these various types of data to the machine as desired, so that it is possible to provide the display which prompts the operator to improve the fuel consumption at a good timing, such as when he is not performing driving operation at good efficiency, or the like. It should be understood that the construction machine is not limited to being a hydraulic power shovel; it could also be a crane or any of various types of crusher.

The invention claimed is:

1. A construction machine comprising:
   a detecting means for measuring a fuel consumption ratio of the construction machine, said fuel consumption ratio being the fuel consumption per mechanical machine work done, and
   an indicating means for providing a first indication for communicating a difference between the measured fuel consumption ratio and a set fuel consumption ratio.

2. The construction machine according to claim 1,
   wherein the construction machine includes a traveling unit and a working machine mounted on the traveling unit, and
   wherein said fuel consumption ratio is fuel consumption per mechanical machine work done by the working machine.

3. The construction machine according to claim 2, wherein when the measured fuel consumption ratio is larger than the set fuel consumption ratio, the indicating means provides a second indication for prompting an improvement of fuel consumption.

4. The construction machine according to claim 3, wherein the second indication for prompting the improvement of fuel consumption includes a display displayed on a monitor screen which is provided in an operator cab of the construction machine.

5. The construction machine according to claim 4, wherein the second indication for prompting the improvement of fuel consumption includes a voice presentation by a voice generator which is provided in an operator cab of the construction machine.

6. The construction machine according to claim 3, wherein the second indication for prompting the improvement of fuel consumption includes a voice presentation by a voice generator which is provided in an operator cab of the construction machine.

7. The construction machine according to claim 1, wherein when the measured fuel consumption ratio is larger than the set fuel consumption ratio, the indicating means provides a second indication for prompting an improvement of fuel consumption.

8. The construction machine according to claim 7, wherein the second indication for prompting the improvement of fuel consumption includes a display displayed on a monitor screen which is provided in an operator cab of the construction machine.

9. The construction machine according to claim 8, wherein the second indication for prompting the improvement of fuel consumption includes a voice presentation by a voice generator which is provided in an operator cab of the construction machine.

10. The construction machine according to claim 7, wherein the second indication for prompting the improvement of fuel consumption includes a voice presentation by a voice generator which is provided in an operator cab of the construction machine.

11. A method of enhancing the efficiency of fuel consumption of a construction machine, the method including the steps of:
    measuring a fuel consumption ratio of the construction machine, the fuel consumption ratio being the fuel consumption per mechanical machine work done; and
    providing a first indication for communicating a difference between the measured fuel consumption ratio and a set fuel consumption ratio.

12. The method according to claim 11, wherein the construction machine includes a traveling unit and a working machine, and wherein the fuel consumption ratio is the fuel consumption per mechanical machine work done by the working machine.

13. The method according to claim 12, wherein when the measured fuel consumption ratio is larger than the set fuel consumption ratio, the method further includes the step of providing a second indication for prompting an improvement of fuel consumption.

14. The method according to claim 11, wherein when the measured fuel consumption ratio is larger than the set fuel consumption ratio, the method further includes the step of providing a second indication for prompting an improvement of fuel consumption.

15. A construction machine comprising:
    measurement means for measuring a fuel consumption ratio corresponding to mechanical machine work done;
    storage means for storing a plurality of reference fuel consumption ratios which are set in advance, corresponding to different work loads;
    selection means for selecting the reference fuel consumption ratio which corresponds to the work load from the storage means;
    comparison means for comparing the fuel consumption ratio measured by the measurement means and the reference fuel consumption ratio selected by the selection means; and
    output means for outputting the result of comparison by the comparison means.

16. The construction machine according to claim 15, further comprising:
    control means which has a plurality of selective work modes having respectively different reference load values, for controlling an operation of the construction machine so that the work load thereof matches the reference load value corresponding to the selected work mode.

17. A method of enhancing the efficiency of fuel consumption of a construction machine, the method including the steps of:
    measuring a fuel consumption ratio of the construction machine, the fuel consumption ratio corresponding to mechanical machine work done;
    storing in a storage means a plurality of reference fuel consumption ratios which are set in advance, corresponding to different work loads;
    selecting the reference fuel consumption ratio which corresponds to a particular work load from the reference fuel consumption ratios stored in the storage means;
    comparing the measured fuel consumption ratio with the selected reference fuel consumption ratio; and
    outputting the comparison result.

18. The method according to claim 17, further comprising the steps of:
    providing a control means which has a plurality of selective work modes having respectively different reference load values, for controling an operation of the construction machine so that the work load thereof matches the reference load value corresponding to the selected work mode, the storage means storing the reference fuel consumption ratios which correspond to the work modes; and
    selecting the reference fuel consumption ratio which corresponds to the selected work mode.

19. A construction machine, comprising:
    measurement means which measures a fuel consumption ratio;

storage means which stores a plurality of reference fuel consumption ratios which are set in advance, corresponding to different work loads;

selection means which selects the reference fuel consumption ratio which corresponds to the work load from the storage means;

comparison means which compares the fuel consumption ratio measured by the measurement means and the reference fuel consumption ratio selected by the selection means;

output means which outputs the result of comparison by the comparison means, and control means which has a plurality of selective work modes having respectively different reference load values, and controls an operation of the construction machine so that the work load thereof matches the reference load value corresponding to the selected work mode, wherein the storage means stores the reference fuel consumption ratios which correspond to the work modes; and the selection means selects the reference fuel consumption ratio which corresponds to the selected work mode.

* * * * *